(12) United States Patent
Masson et al.

(10) Patent No.: US 7,018,002 B2
(45) Date of Patent: Mar. 28, 2006

(54) MOTOR VEHICLE MASTER CYLINDER WITH DEVICE FOR DETECTING ACTUATION OF A BRAKING SYSTEM

(75) Inventors: Olivier Masson, Paris (FR); Jean Fourcade, Champs sur Marne (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/780,326

(22) Filed: Feb. 17, 2004

(65) Prior Publication Data

US 2004/0164611 A1    Aug. 26, 2004

(30) Foreign Application Priority Data

Feb. 21, 2003    (FR) .................................. 03 02203

(51) Int. Cl.
*B60T 8/44*    (2006.01)
*B60T 8/60*    (2006.01)

(52) U.S. Cl. ............... 303/113.4; 303/155; 188/1.11 E; 324/207.13; 60/534

(58) Field of Classification Search ........... 324/207.13, 324/207.24; 303/113.4, 155; 188/1.11 E; 60/534
See application file for complete search history.

(56) References Cited

U.S. PATENT DOCUMENTS

| | | | |
|---|---|---|---|
| 2,987,669 A * | 6/1961 | Kallmann .................... 324/251 |
| 3,164,013 A * | 1/1965 | Schmahl et al. ............... 73/862 |
| 3,752,039 A * | 8/1973 | Hewins ........................ 91/171 |
| 4,086,533 A * | 4/1978 | Ricouard et al. ......... 324/207.2 |
| 4,204,158 A * | 5/1980 | Ricouard et al. ......... 324/207.2 |
| 4,471,304 A * | 9/1984 | Wolf ...................... 324/207.24 |
| 4,532,810 A * | 8/1985 | Prinz et al. .................... 73/717 |
| 4,639,665 A * | 1/1987 | Gary ....................... 324/117 H |
| 4,665,362 A * | 5/1987 | Abel et al. ................ 324/207.2 |
| 4,851,772 A * | 7/1989 | Acht et al. ............. 324/207.24 |
| 4,855,675 A * | 8/1989 | Russell et al. ......... 324/207.19 |
| 4,857,824 A * | 8/1989 | Tew ............................ 323/347 |
| 4,914,916 A * | 4/1990 | Leigh-Monstevens et al. .......... 60/534 |
| 5,477,675 A * | 12/1995 | Ingraham et al. ............. 60/418 |
| 5,532,585 A * | 7/1996 | Oudet et al. ........... 324/207.22 |
| 5,600,238 A * | 2/1997 | Holloway et al. ...... 324/207.21 |
| 5,841,273 A * | 11/1998 | Muraji ................... 324/207.17 |
| 6,304,078 B1 * | 10/2001 | Jarrard et al. ............ 324/207.2 |
| 6,619,039 B1 * | 9/2003 | Zehnder et al. ................ 60/534 |
| 6,652,039 B1 * | 11/2003 | Shull et al. ............... 303/113.2 |
| 2004/0263155 A1 * | 12/2004 | Schroeder et al. ...... 324/207.12 |
| 2005/0000772 A1 * | 1/2005 | Wohner .................... 192/30 W |

* cited by examiner

*Primary Examiner*—Robert A. Siconolfi
(74) *Attorney, Agent, or Firm*—Leo McCormick, Jr.; Warren Comstock

(57) ABSTRACT

The invention proposes a master cylinder 1 with a device for detecting actuation of a braking system. The detection device is fixed to a body 2 of the master cylinder 1 at a pressure chamber 5. The detection device comprises a magnetic circuit 9 able to be opened and closed by a moving magnetic piece 19. The moving magnetic piece 19 is, for example, fixed to a piston 4 of the master cylinder 1. Actuation of a brake pedal causes the piston 4 and the moving piece 19 to advance in the master cylinder 1. The magnetic circuit 9 therefore changes state (opened or closed). The change in state of the magnetic field switches the brake lights on and off.

6 Claims, 4 Drawing Sheets

MOTOR VEHICLE MASTER CYLINDER WITH DEVICE FOR DETECTING ACTUATION OF A BRAKING SYSTEM

The subject of the present invention is a motor vehicle master cylinder with a device for detecting actuation of a braking system. The invention is aimed more particularly at a particular siting on the master cylinder of this device for detecting actuation of a braking system.

The object of the invention is to provide a system that is early in detecting the braking of the vehicle. Another object of the invention is to propose such a braking detection system that is readily accessible to a driver or to a repairer when the system needs working on. An additional object of the invention is to provide a master cylinder comprising such a device for detecting actuation of a braking system, which occupies a small amount of space in the engine compartment.

In general, the detector of actuation of a braking system of a vehicle is sited near a brake pedal. Such a detection system serves, amongst other things, to switch the vehicle brake lights on and off. These brake lights, or stop lights, need therefore to be switched on early. That is to say that they need to be switched on as soon as the vehicle first starts to brake.

In the prior art, a switch is placed near a brake pedal. Depression of the brake pedal actuates the switch and switches the stop lights on. The proximity between the switch and the brake pedal means that the stop lights can be switched on early. However, such a device entails a special and poorly accessible location: the cabin. Hence, in the event of malfunctioning or if a simple inspection is required, the device is difficult to access. Furthermore, as space in the cabin is measured, the dimensions of the device need to be calculated and checked very precisely.

Also known is a device for detecting actuation of the braking system that is fixed to one end of a master cylinder. In this case, the master cylinder is longer than a master cylinder that does not comprise this device. This is because the device for detecting actuation of the braking system, built into the end of the master cylinder, lengthens the master cylinder by a corresponding amount.

In such a device, the driver for example presses on a brake pedal, which pushes a control rod. The control rod actuates a piston of the master cylinder. The piston, placed in a bore of a master cylinder body, advances within the master cylinder. The advance of the piston moves a moving magnetic piece. The moving magnetic piece for example closes a magnetic circuit.

The magnetic circuit is placed at the end of the master cylinder, in the length of the master cylinder. For example, in the open position, the magnetic circuit does not switch the stop lights on. When the brake pedal is actuated, the moving piece moves and closes the magnetic circuit which then switches the stop lights on.

The magnetic circuit is generally made up of at least one pole piece, a magnet and a magnetic detector. The moving magnetic piece is also a pole piece.

The movement of the moving magnetic piece needs to take place immediately after the movement of the brake pedal, so that the stop lights come on early during braking. Although such a device allows early detection of braking and the device is readily accessible, because it is in the engine compartment, it is too bulky.

The present invention therefore proposes a master cylinder for a motor vehicle braking system comprising a device for the early detection of actuation of a braking system. The device of the invention is also easy for a driver or a repairer to access. In addition, the device takes up less space in the engine compartment.

The principle of the invention consists in detecting movement of a piston of the master cylinder via a magnetically sensitive position sensor. Thus, it is no longer the direct movement of the pedal that is taken into consideration, but a movement of a piece driven indirectly by a movement of the pedal. The invention also consists in placing such a detection device on the body of the master cylinder so that the master cylinder takes up little space in the engine compartment is small. The detection device comprises a magnetically sensitive position sensor, part of which is secured to the master cylinder piston. Thus, the slightest movement of the master cylinder piston alters the state of a magnetic circuit. As the magnetic circuit is connected to an electric circuit that switches the stop lights on and off the change in the state of the magnetic circuit allows the stop lights to be switched on and/or off.

The subject of the invention is therefore a master cylinder for a motor vehicle braking system, comprising
a master cylinder body made of non-magnetic material,
a bore formed in the body of the master cylinder,
a variable-volume pressure chamber inside the bore,
a piston sliding in the bore and varying the volume of the pressure chamber,
a detection device detecting actuation of the braking system, fixed to the body of the master cylinder, facing a passage of the piston, the detection device being equipped with at least one magnetic circuit that can be opened or closed by a magnetic piece, characterised in that the magnetic piece is carried by the piston.

Another subject of the present invention is a master cylinder characterized in that the said detection device comprises a first magnetic circuit and a second magnetic circuit, the first circuit being equipped with a magnet and the second magnetic circuit being equipped with a circuit of the reed switch type, so that when the piston is at rest, a magnetic flux that may flow through the second magnetic circuit is not enough to activate the reed switch circuit.

The invention will be understood more clearly from reading the description which follows and from examining the accompanying figures. These figures are given merely by way of nonlimiting indication of the invention.

DETAILED DESCRIPTION OF THE INVENTION

Figure 1:
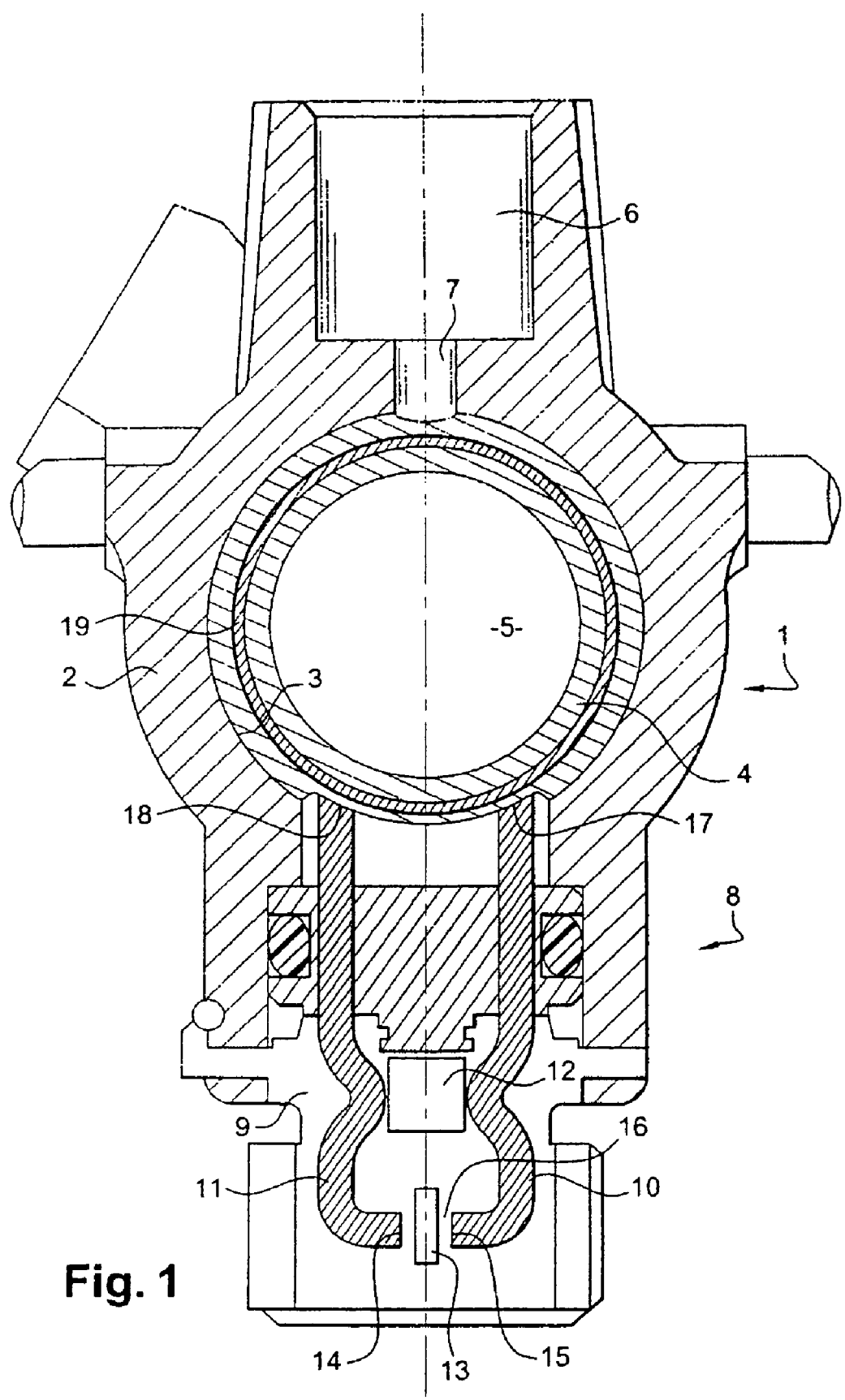
FIG. 1: a view in cross section of a master cylinder incorporating a position sensor according to the invention.

FIG. 1 depicts a master cylinder 1 of cylindrical overall shape. Formed in a body 2 of the master cylinder 1 is a bore 3. A piston 4 moves in translation in the bore 3.

In the case of a tandem master cylinder, it is preferably a secondary piston that is represented by the piston 4. Indeed, in a tandem master cylinder, the movement of the secondary piston is the most representative of the movement of the brake pedal. The movement of the piston causes the volume of a pressure chamber 5 to vary.

Fixed to the master cylinder 1 is a hydraulic fluid reservoir (not depicted). The hydraulic fluid is distributed, for example, to brake pads. Tubular nozzles on the hydraulic reservoir are, for example, pushed into a bore 6 the dimensions of which correspond to the dimensions of the tubular nozzle of the reservoir. A feed orifice 7 allows hydraulic fluid to pass from the hydraulic fluid reservoir to the chamber 5 of the master cylinder. The bore 6 is considered to be situated on an upper part of the master cylinder 3.

A lower region 8 of the master cylinder 1, opposite the bore 6, comprises a system 9 for detecting actuation of a braking system. The detection system 9 is a magnetically sensitive system. It comprises a magnetic circuit. For example, it comprises two pole pieces 10 and 11. A magnet 12 is placed between the two branches 10 and 11. The magnet 12 may be a polarized permanent magnet. A magnetic detector 13, or sensor, is also placed between the two pole pieces 10 and 11. An air gap 16 is formed at the location of the magnet 12 and at the location of the sensor 13. Another air gap is formed at the location of the moving magnetic piece 19.

In FIG. 1, the magnetic detector 13 closes one side of the magnetic circuit, that is to say is placed between a lower end 14 of the pole piece 11 and a lower end 15 of the pole piece 10. The magnet 12 is placed between the magnetic detector 13 and the piston 4.

It is also possible to reverse the position of the magnet 12 and of the magnetic detector 13.

It is obviously possible to provide 3 pole pieces rather than the two pole pieces 10 and 11. For example, a space is formed between two pole pieces, a magnetic magnet being arranged in this space. A third pole piece closes the circuit. The magnetic detector may then be housed in a second space formed by one of the first two pole pieces and by the third pole piece.

In FIG. 1, upper ends 17 and 18 of the pole pieces 10 and 11 end in the bore 13 at the piston 4. Fixed or overmolded onto the piston 4 is a moving magnetic piece 19. This moving magnetic piece 19 will open or close the magnetic circuit 9. The moving magnetic piece 19 is also a pole piece.

The pole pieces are made for example of steel. The master cylinder may be made of aluminum or any other non-magnetic material.

The pole piece 19 mounted on the piston 4 moves translationally in the bore 3 of the master cylinder 1. The location of the pole piece 19 is such that the movement of the piston 4, and therefore of the moving piece 19, opens or closes the magnetic circuit.

In FIG. 1, the moving piece 19 follows the contour of the piston 4. However, it is possible for the moving piece 19 not to follow the entire contour of the piston 4. Indeed, all that is required is for the moving piece 19 to have sufficient dimensions that it closes the magnetic circuit 9, at the ends 17 and 18 of the pole pieces 10 and 11. Hence, it is possible to provide a moving piece 19 that, for example, has a semicylindrical shape arranged in the lower part of the cylinder that forms the piston 4.

The piston 4, actuated indirectly by the brake pedal, moves translationally in the bore 3. The movement of the piston 4 causes movement of the moving piece 19. This movement causes a variation in the magnitude of the magnetic field. The sensor 13 measures this variation. The sensor 13 is connected to an electrical system (not depicted) which switches the stop lights on or off, according to the magnitude of the magnetic field in the air gap 16.

It will be readily understood that a master cylinder according to the invention has a smaller bulk, in the engine compartment, than a master cylinder of the prior art. Indeed, as the detection device is not fixed to one end of the master cylinder, its length is not increased by comparison with a master cylinder that is not fitted with a device that detects actuation of the braking system.

Figure 2:
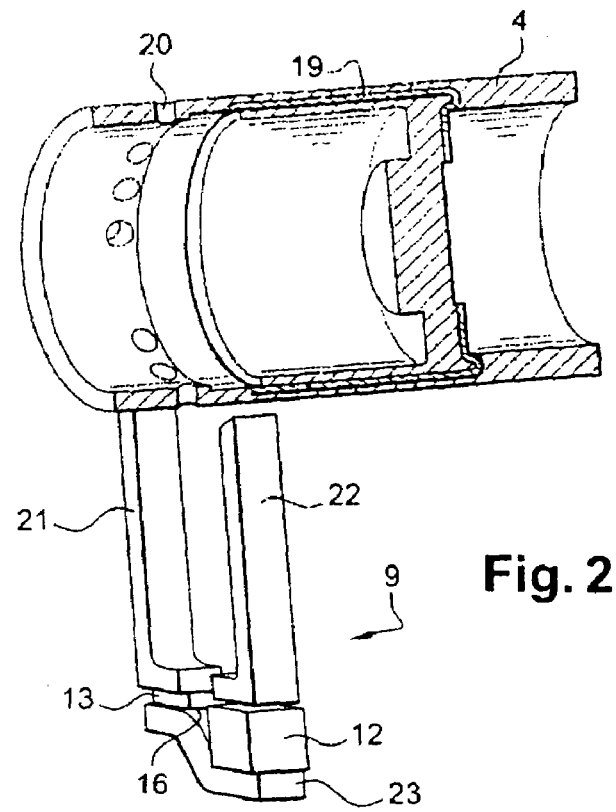
FIG. 2: a depiction of a magnetic circuit according to a particular embodiment of the invention.
Figure 3:
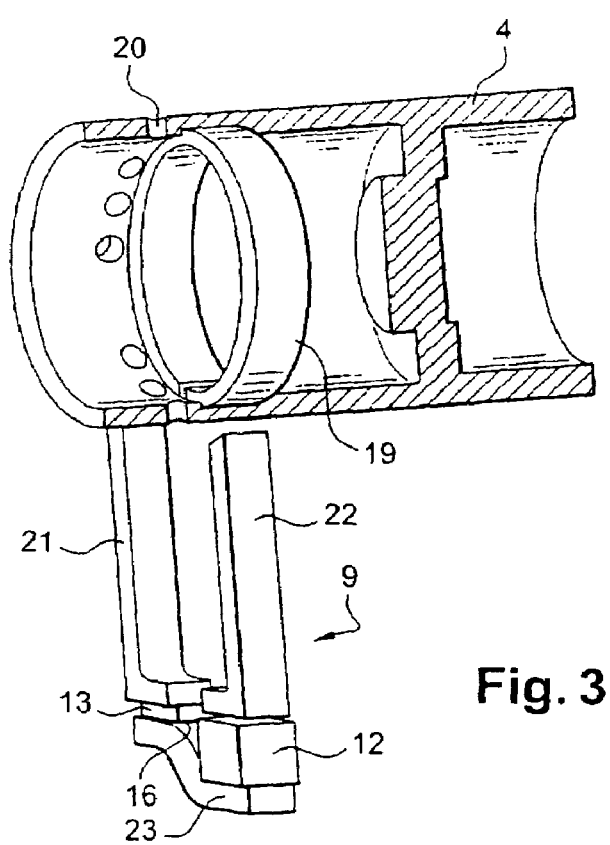
FIG. 3: a depiction of a magnetic circuit according to another particular embodiment of the invention.

FIGS. 2 and 3 depict a longitudinal section of a magnetic circuit incorporated into a master cylinder of the invention. The master cylinder (not depicted in FIGS. 2 and 3) is a master cylinder with expansion holes. The master cylinder may also be a master cylinder with valves, or any other known master cylinder.

The piston 4 is equipped with an expansion hole 20.

The magnetic circuit 9 is formed, in FIGS. 2 and 3, of three pole pieces 21, 22 and 23 which are fixed. The pole pieces 21, 22 and 23 for example form a U. The pole pieces 21 and 22 form two branches of the U and are perpendicular to the piston 4. The pole piece 23 forms a base of the U, parallel to the piston 4. The magnet 12 is, for example, housed in a space formed between a lower end of the pole piece 22 and the pole piece 23. The magnetic detector 13 is, for example, housed in a space formed between a lower end of the pole piece 21 and the pole piece 23. The lower end of a pole piece, 21 and 22, is to be understood as meaning the end furthest from the piston 4.

In FIG. 2, the moving magnetic piece 19 is formed of a sleeve tube. The sleeve tube 19 is, for example, molded into the piston 4, near the expansion hole 20, on the same side as a push rod, that is to say on the opposite side to a closed end of the master cylinder. The sleeve tube 19 may also be mounted in the piston. Thus, when the master cylinder is in the rest position, that is to say when the brake pedal is not actuated, the magnetic circuit 9 is open. In other words, the sleeve tube 19 is distant from the magnetic circuit.

In the configuration as depicted in FIG. 2, when the magnetic circuit 9 is open, the stop lights are off. Under braking, a driver presses on the brake pedal, which actuates the master cylinder. The piston 4 moves inside the bore. The moving piece 19 nears the magnetic circuit 9 and closes the circuit. The magnitude of the magnetic field as measured by the sensor 13 varies. The sensor 13 therefore sends information to the electrical system to switch the stop lights on.

It is necessary for the stop lights to remain on throughout the duration of the braking. The moving piece 19 has therefore to be long enough for the magnetic circuit to remain closed throughout the braking, that is to say throughout the advance of the piston 4 along the bore. Hence, the stop lights are not switched off inadvertently at the middle of braking. They must also remain on throughout the duration of the return of the master cylinder to the rest position, that is to say throughout the duration of the deceleration of the vehicle, until it stops or accelerates again. The length of the moving piece 19 has therefore to be roughly equal to a working stroke of the piston 4.

When the brake pedal is released, the piston 4 returns to the rest position, taking the moving piece 19 with it. The magnetic circuit 9 is then open again. The magnitude of the magnetic field as measured by the sensor 13 varies. The sensor 13 commands the electrical system to switch the stop lights off.

The magnetic circuit 9 is stationary. The magnetic piece 19 can move and closes the magnetic circuit 9 under braking. The stop lights are then switched on.

The moving piece 19 moves even before the pressure in the master cylinder chamber rises. The variation in the magnetic field as measured by the sensor 13 occurs even before the braking. There is therefore indeed early detection of braking, and switching-on of the stop lights synchronised with braking.

FIG. 3 depicts another embodiment of the invention. The moving piece 19 is molded within the piston 4.

The moving piece 19, in FIG. 3, is formed of a ring 19. The ring 19 is, for example, placed near the expansion hole 20. The magnetic circuit 9 is positioned facing the ring 19. That is to say that the ring 19 closes the magnetic circuit 9 when the master cylinder is at rest. The magnitude of the magnetic field is measured by the sensor 13. The sensor 13 sends information to an electrical system (not depicted) which commands the switching-off or switching-on of the stop lights.

Under braking, the brake pedal is depressed, and this causes the piston 4 to advance within the bore. The translational movement of the piston 4 causes a translational movement of the ring 19. The ring 19 therefore moves away from the magnetic circuit 9. The magnetic circuit 9 is therefore opened. The magnitude of the magnetic field as measured by the sensor 13 alters. Information sent to the electrical system (not depicted) causes the lights to be switched on.

Throughout the duration of a stroke of the piston 4, the magnetic circuit 9 is open. The opening of the magnetic circuit is accompanied by switching-on of the stop lights.

When the brake pedal is released, the piston 4 returns to its initial position. The ring 19 therefore finds itself back in a position such that it closes the magnetic circuit 9. The magnitude of the magnetic field as measured by the sensor 13 varies again. Information is sent to the electrical circuit to switch the stop lights off.

Thus, in the exemplary embodiment depicted in FIG. 3, when the magnetic circuit is closed the stop lights are switched off. When the piston 4 moves translationally in the master cylinder, that is to say when the brake pedal is actuated, the ring 19 also moves. The magnitude of the magnetic field as measured by the sensor 13 varies. The information sent to the electrical circuit is therefore such that the stop lights are switched on. Throughout the duration of the movement of the piston 4, the magnetic circuit is open and the stop lights are on.

Figure 4A:
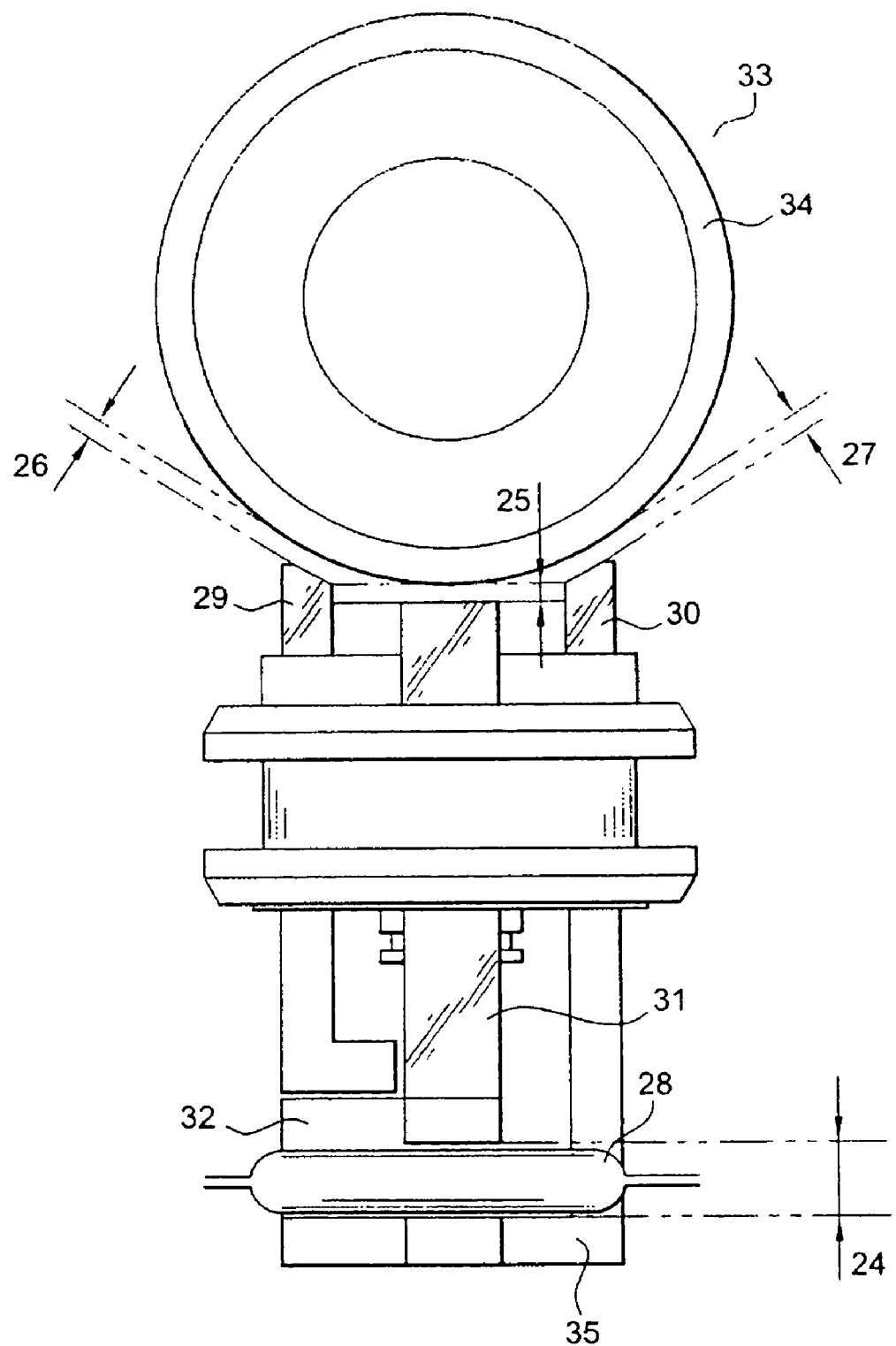
FIG. 4*a*: a general view in cross section of a master cylinder, according to a particular embodiment of the invention.
Figure 4B:
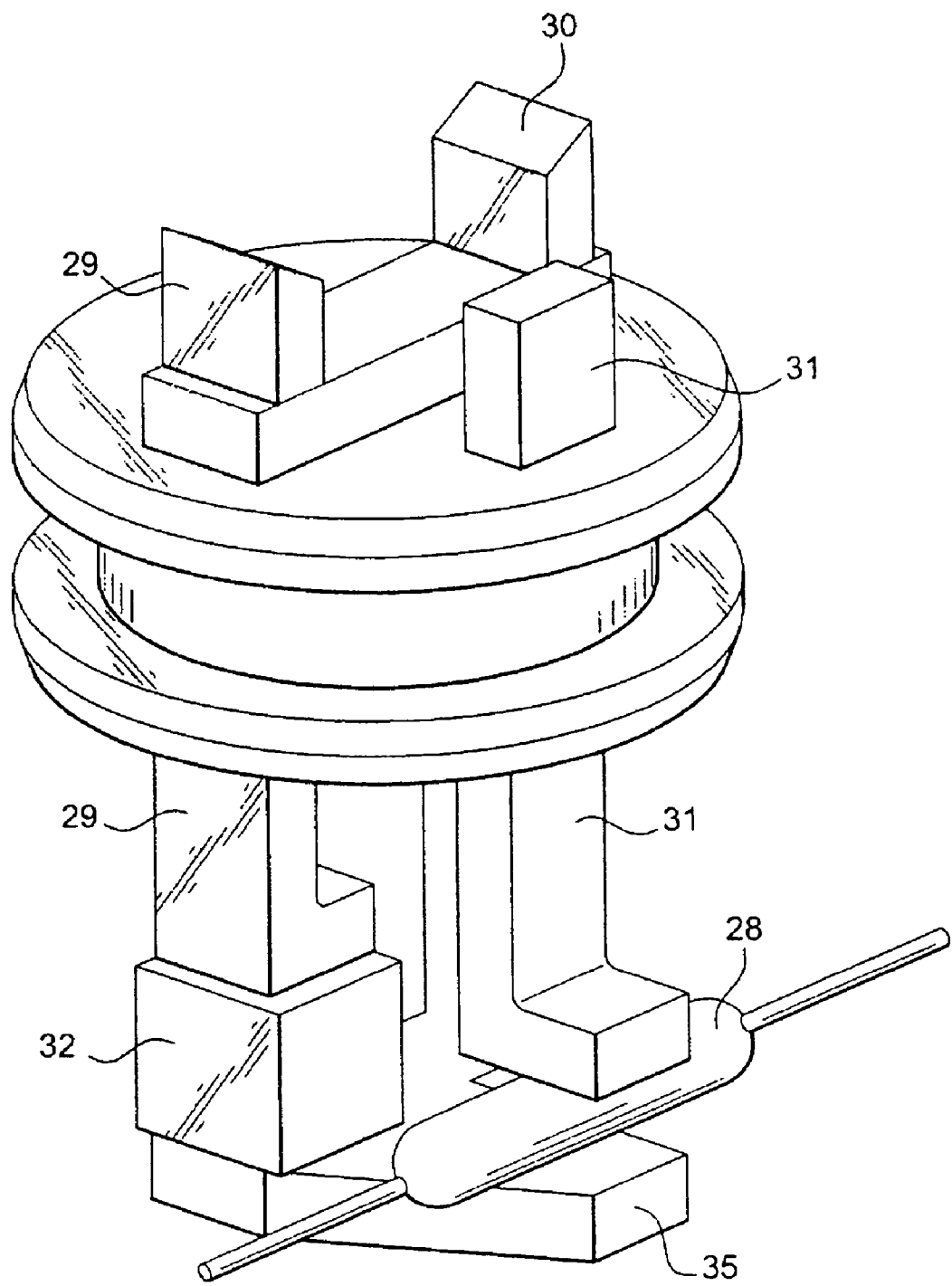
FIG. 4*b*: a perspective view of a magnetic circuit of FIG. 4*a*.

FIGS. 4a and 4b depict a particular embodiment of the invention. The sensor is equipped with a reed switch. The reed switch circuit is, for example, contained within a bulb 28.

The magnetic circuit comprises three pole pieces 29, 30 and 31 which are fixed. In the example depicted, the pole pieces 29, 30 and 31 are mutually parallel and are perpendicular to a master cylinder body 33. One of the three pole pieces 30 ends, at an opposite end to the master cylinder, in a base 35.

One moving magnetic piece (not visible) is housed in the piston 34, or inside the piston 34. Advantageously, at rest, the moving piece faces the pole pieces 29 and 30. However, provision could be made for the moving piece to be remote from the pole pieces 29, 30 and 31 when the piston 34 is not actuated.

As a reed switch detector is very sensitive to magnetic flux, it is preferable to have no magnetic fields, or the weakest possible magnetic field, in the circuit containing the bulb 28 when a piston 34 of the master cylinder is in the rest position, so as to ensure the most reliable detection operation. For that, use is made of two magnetic circuits. A first magnetic circuit, formed by two pole pieces 29 and 30, houses a magnet 32. For example, the magnet is located between a lower end of the pole piece 29 and the base 35 of the pole piece 30. Residual magnetic flux flows through this circuit when the piston 34 is not actuated. Housed in a second circuit, formed by the pole piece 29 and the pole piece 31, is the reed switch bulb 28. When the piston 34 is not actuated, no magnetic flux flows through this second circuit.

An advance of the piston 34 causes an advance of the moving magnetic piece, which nears the pole pieces 29 and 30 and then the pole piece 31. Thus, magnetic flux flows through the first circuit, then through the second.

In the exemplary embodiment depicted in FIG. 4a there is, on the one hand, a first air gap 26 formed between the pole piece 29 and the moving piece of the piston 34, and a second air gap 27 formed between the pole piece 30 and the moving piece. These two air gaps 26 and 27 allow residual magnetic flux to flow even though the piston 34 is not actuated.

On the other hand, there is a third air gap 25 between the pole piece 31 and the moving piece of the piston 34, and a fourth air gap 24 between the pole piece 29 and the pole piece 31, advantageously allowing the passage only of a magnetic flux that is weak enough that it does not activate the reed switch bulb when the piston 34 is not actuated.

To achieve that it is advantageous for the sum of the first and second air gaps 26 and 27 to be smaller than the sum of the first, third and fourth air gaps 26, 25, 24. Thus, the reed switch bulb 28, contained in the circuit formed by the pole pieces 29 and 31, is completely isolated from any residual magnetic flux when the piston 34 is not actuated. The magnetic circuit containing the magnet 32, for its part, allows residual magnetic flux to circulate. As soon as the piston 34 advances, the magnetic circuit containing the bulb 28 is closed and magnetic flux can circulate therein.

The sensor, or magnetic detector, may also consist of a Hall-effect cell or of a magneto-resistive effect (AMR, GMR) cell.

The moving piece may be molded, overmolded or fixed onto the piston. However, in a preferred exemplary embodiment of the invention, the moving piece is molded or fixed into the piston. The moving piece may, for example, be overmolded in a piston made of plastic.

It is also possible to mount the moving piece inside the piston. Use is then made, for example, by way of moving piece, of a ring or of a sleeve tube which is split. The split piece is inserted inside the piston, closing the piece up on its diameter. Once inserted inside the piston, the split piece is released and relaxes until it fits an interior contour of the piston.

Thus, particularly in the case of a master cylinder with an expansion hole, an exterior contour of the piston is perfectly smooth. When the piston slides in the body of the master cylinder, it comes in particular into contact with at least one sealing cup. The sealing cup is housed in a bore formed in the master cylinder. The bore is partially open at a pressure chamber in which the piston slides. Such an embodiment of the invention in which the moving piece is inside the piston and the exterior contour of the piston is perfectly smooth makes it possible not to damage the sealing cup as the piston advances.

Any other means of fixing allowing translational movement of the moving piece inside the body of the master cylinder falls within the scope of the invention.

The polarised magnet may be made of a material with low magnetic losses with respect to temperature, of the AlNiCo or samarium-cobalt type.

In general, the master cylinder may be made of any non-magnetic material, such as aluminum.

The pole piece and the moving element that form the magnetic circuit are, for example, made of ferromagnetic materials. Depending on the required precision, the pole pieces are, for example, made of conventional steel of type XC10 or of a steel with superior ferromagnetic properties, X6CrNiMoTi17-12-2 or X5CrNiMo17-12-2, as marketed by Sandvik (reference: R Fe 80 C).

Such a sensor can be used for all functions requiring knowledge of the position of one piece relative to another.

We claim:

1. A master cylinder (1) for a motor vehicle braking system, comprising:
   a body (2) made of non-magnetic material;
   a bore (3) located in the body (2) of the master cylinder;
   a variable-volume pressure chamber (5) within the bore (3);
   a piston (34) located in the bore that slides therein for varying the volume of the pressure chamber (5); and
   a detection device (9) fixed to the body (2) of the master cylinder and facing the bore for detecting actuation of the braking system corresponding to movement of the piston, said detection device having first circuit and a second circuit that are opened or closed by a magnetic piece (19) carried by the piston (4), characterized in that said first magnetic circuit is defined by a first pole piece (29) having a first gap (26) formed with the magnetic piece (19), a second pole piece (30) having a second gap (27) formed with the magnetic piece (19) and a magnet (32) located between the first and second pole pieces such that when said piston is in a rest position a residual magnetic flux flows in said first magnetic circuit by way of said first and second air gaps and said second magnetic circuit is defined by a third pole piece (31) having a third gap (25) formed with the magnetic piece (19) and a fourth gap (24) formed between said first pole piece (29) and said third pole piece (31) and a magnetic-field-variation sensor (28) that is isolated from said residual magnetic flux flow in said first magnetic circuit by said third gap and said fourth gap when the piston (34) is in the rest position and only when the piston moves is the magnetic-field-variation sensor (28) closed and magnetic flux flow occurs in the second magnetic circuit to provide an indication of the movement of the piston (34).

2. The master cylinder according to claim 1, characterized in that said first pole piece (29), said second pole piece (30) and said third pole piece (31) are mutually parallel and are perpendicular to a forward travel of the piston (34).

3. The master cylinder according to claim 2, characterized in that a sum of the first air gap (26) and second air gap (27) is less than a sum of the first gap (26), third air gap (25) and fourth air gap (24) and as a result said second magnetic circuit is initially isolated from said first magnetic circuit.

4. The master cylinder according to claim 3, characterized in that the magnetic piece (19) is a sleeve tube (19) having a length equal to a working stroke of the piston (34) such that when the piston (34) is in the rest position the first and second magnetic circuits are open and on movement of said piston said first and second magnetic circuit remains are sequentially closed.

5. The master cylinder according to claim 4, characterized in that the magnetic-field-variation sensor is a reed switch.

6. The master cylinder according to claim 4 wherein said movement of said magnetic piece (19) a signal is derived from said first magnetic circuit to provide a continuous visual indication of a brake application.

* * * * *